(12) United States Patent
Lee et al.

(10) Patent No.: US 10,871,677 B2
(45) Date of Patent: Dec. 22, 2020

(54) WIDE COLOR GAMUT FILM, COMPOSITION FOR PREPARING THE SAME, POLARIZING PLATE COMPRISING THE SAME, AND LIQUID CRYSTAL DISPLAY COMPRISING THE POLARIZER PLATE

(71) Applicant: LG CHEM, LTD., Seoul (KR)

(72) Inventors: Han Na Lee, Daejeon (KR); Byung Min Lee, Daejeon (KR); Kyung Ki Hong, Daejeon (KR); Yeong Rae Chang, Daejeon (KR); Dong Hwan Ryu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 258 days.

(21) Appl. No.: 15/741,476

(22) PCT Filed: Jul. 6, 2016

(86) PCT No.: PCT/KR2016/007319
§ 371 (c)(1),
(2) Date: Jan. 2, 2018

(87) PCT Pub. No.: WO2017/007236
PCT Pub. Date: Jan. 12, 2017

(65) Prior Publication Data
US 2018/0373096 A1    Dec. 27, 2018

(30) Foreign Application Priority Data
Jul. 6, 2015   (KR) .................. 10-2015-0096161

(51) Int. Cl.
*G02F 1/13357* (2006.01)
*C09D 133/06* (2006.01)
(Continued)

(52) U.S. Cl.
CPC ........ *G02F 1/133606* (2013.01); *C08L 57/10* (2013.01); *C08L 57/12* (2013.01);
(Continued)

(58) Field of Classification Search
CPC ............ G03F 7/0007; G02F 1/133509; G02F 1/133514; G02F 1/133528;
(Continued)

(56) References Cited

U.S. PATENT DOCUMENTS 6,836,383 B1 * 12/2004 Ozawa ................... G02B 5/223
                                                      359/885
7,655,306 B2    2/2010 Lee et al.
(Continued)

FOREIGN PATENT DOCUMENTS

CN    1891743    1/2007
CN    101169487    4/2008
(Continued)

*Primary Examiner* — John A McPherson
(74) *Attorney, Agent, or Firm* — Dentons US LLP

(57) ABSTRACT

The present disclosure relates to a wide color gamut film, a composition for preparing the same, a polarizing plate including the same, and a liquid crystal display including the polarizing plate. More specifically, the present disclosure relates to a wide color gamut film capable of improving color gamut by increasing color purity and exhibiting excellent physical and optical characteristics, a composition for preparing the same, a polarizing plate including the same, and a liquid crystal display including the polarizing plate.

8 Claims, 1 Drawing Sheet

(51) Int. Cl.
*C09D 5/32* (2006.01)
*C09D 7/63* (2018.01)
*C09D 4/00* (2006.01)
*G02F 1/1335* (2006.01)
*G02B 5/02* (2006.01)
*C08L 57/10* (2006.01)
*C08L 57/12* (2006.01)
*G02B 5/22* (2006.01)
*C08K 5/3467* (2006.01)
*C09B 47/00* (2006.01)
*G02B 5/30* (2006.01)

(52) U.S. Cl.
CPC ............... *C09D 4/00* (2013.01); *C09D 5/32* (2013.01); *C09D 7/63* (2018.01); *C09D 133/06* (2013.01); *G02B 5/0242* (2013.01); *G02B 5/223* (2013.01); *G02F 1/133509* (2013.01); *G02F 1/133528* (2013.01); *C08K 5/3467* (2013.01); *C08L 2203/16* (2013.01); *C08L 2203/20* (2013.01); *C09B 47/00* (2013.01); *G02B 5/3025* (2013.01); *G02F 1/133514* (2013.01); *G02F 2001/133607* (2013.01); *G02F 2202/28* (2013.01)

(58) Field of Classification Search
CPC ........... G02F 1/133606; G02F 2202/28; G02B 5/223; G02B 5/3025; G02B 5/0242
USPC ................................................ 430/7; 349/106
See application file for complete search history.

(56) References Cited

U.S. PATENT DOCUMENTS

| | | | |
|---|---|---|---|
| 9,316,769 B2 | 4/2016 | Chang et al. | |
| 10,473,825 B2 | 11/2019 | Kim et al. | |
| 2002/0005509 A1* | 1/2002 | Teng | H01J 11/44 252/582 |
| 2005/0046321 A1* | 3/2005 | Suga | G02B 6/0041 313/112 |
| 2005/0186421 A1 | 8/2005 | Choi et al. | |
| 2006/0292462 A1 | 12/2006 | Seo et al. | |
| 2007/0275184 A1 | 11/2007 | Lee et al. | |
| 2008/0174874 A1 | 7/2008 | Kanaya | |
| 2009/0251644 A1 | 10/2009 | Park et al. | |
| 2013/0306920 A1* | 11/2013 | Maeda | C09B 23/0041 252/586 |
| 2016/0161801 A1 | 6/2016 | Watano et al. | |

FOREIGN PATENT DOCUMENTS

| | | |
|---|---|---|
| CN | 101495891 | 7/2009 |
| JP | 2003-195278 | 7/2003 |
| JP | 2003248218 | 9/2003 |
| JP | 2004093993 | 3/2004 |
| JP | 2008203436 | 9/2008 |
| JP | 2010-134349 | 6/2010 |
| JP | 2013210577 | 10/2013 |
| JP | 2014160164 | 9/2014 |
| JP | 2014225008 | 12/2014 |
| JP | 2015036734 | 2/2015 |
| KR | 10-2006-0065831 | 6/2006 |
| KR | 10-0632437 | 10/2006 |
| KR | 10-2009-0005770 | 1/2009 |
| KR | 10-2010-0024784 | 3/2010 |
| KR | 10-2010-0077799 | 7/2010 |
| KR | 10-2012-0010212 | 2/2012 |
| KR | 10-2013-0008466 | 1/2013 |
| KR | 10-2013-0066451 | 6/2013 |
| KR | 10-2015-0039124 | 4/2015 |
| WO | 2014-157963 | 10/2014 |
| WO | 2014171679 | 10/2014 |

* cited by examiner

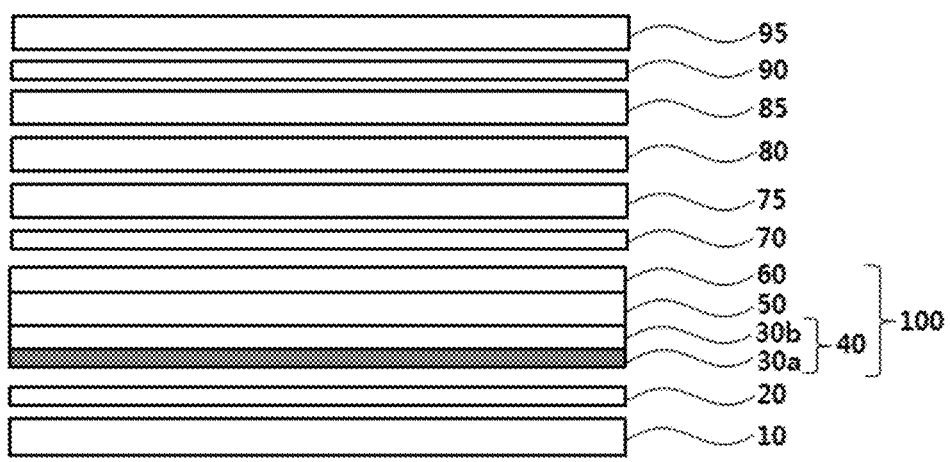

WIDE COLOR GAMUT FILM, COMPOSITION FOR PREPARING THE SAME, POLARIZING PLATE COMPRISING THE SAME, AND LIQUID CRYSTAL DISPLAY COMPRISING THE POLARIZER PLATE

BACKGROUND OF THE INVENTION (a) Field of the Invention

Cross-Reference to Related Application

This application is a National Stage Application of International Application No. PCT/KR2016/007319 filed on Jul. 6, 2016, which claims priority to and the benefit of Korean Patent Application No. 10-2015-0096161 filed on Jul. 6, 2015 with the Korean Intellectual Property Office, both of which are incorporated herein in their entirety by reference for all purposes as if fully set forth herein.

The present disclosure relates to a wide color gamut film, a composition for preparing the same, a polarizing plate including the same, and a liquid crystal display including the polarizing plate.

More specifically, the present disclosure relates to a wide color gamut film capable of improving color gamut by increasing color purity and exhibiting excellent physical and optical characteristics, a composition for preparing the same, a polarizing plate including the same, and a liquid crystal display including the polarizing plate.

(b) Description of the Related Art

A liquid crystal display (LCD) is one of a variety of flat panel displays which are currently widely available. Typically, an LCD is configured such that a liquid crystal layer is interposed between a thin film transistor (TFT) array substrate and a color filter substrate. When an electric field is applied to electrodes of the array substrate and the color filter substrate, liquid crystal molecules of the liquid crystal layer interposed therebetween are differently arranged, thereby displaying an image.

A liquid crystal display obtains a color image by cutting a specific spectrum of a backlight light source by a color filter, and the color purity is influenced by characteristics of various components such as a light source and a color filter, and further a polarizing plate and an alignment film. Therefore, there is an inherent limitation in obtaining high color purity.

Among these, one of the biggest causes of influencing the color purity is the luminescence spectrum characteristic of the light source that emits lights from the back surface of the liquid crystal panel. The emission spectrum distribution of a light source such as a cold cathode fluorescent lamp (CCFL), a hot cathode fluorescent lamp (HCFL), a light emitting diode (LED), etc., has an emission spectrum between each of the RGB wavelengths as sub-bands in addition to the wavelength range corresponding to RGB, which causes color mixing with the color filter to deteriorate the color gamut.

In a liquid crystal display including a color filter, since color purity is essentially determined by the color filter, it is preferable to realize high color gamut by using a color filter having a sharp spectral transmission characteristic. However, because of problems such as durability and light resistance, there is a limit to the color material of the color filter which can be used. Therefore, it is not easy to improve the color purity of a liquid crystal display by using a color filter having sharper spectral transmission characteristic in reality.

On the other hand, the lights emitted from a light source pass through a light guide plate and a diffusion sheet in a liquid crystal display, resulting in a decrease in brightness of the light. Therefore, the liquid crystal display includes a prism sheet for collecting the light again to increase the brightness, and the prism sheet is normally located under a lower polarizing plate. However, as the display becomes larger, a slack of the lower polarizing plate occurs, and damages such as cracks on the lower polarizing plate occur due to the concavo-convex structure of the prism sheet contacting with the lower polarizing plate. In order to solve this problem, a method of coating a hard coating layer on a protective film of a lower polarizing plate has been proposed, but there is a problem in high process cost.

In accordance with such necessity, it is still required to develop a method for improving the color gamut of the liquid crystal display and preventing damages to the lower polarizing plate by the prism sheet, without an excessive additional process.

SUMMARY OF THE INVENTION

In order to solve the above problems, the present inventors researched on a method of improving the color gamut at low cost by improving the protective film of the lower polarizing plate among elements included in the liquid crystal display (LCD) without changing the backlight or the color filter, and a solution to the problem of damaging the protective film of the lower polarizing plate due to the prism sheet, and have completed the present invention.

Accordingly, the present disclosure provides a wide color gamut film capable of improving color gamut by increasing color purity, and exhibiting excellent physical and optical characteristics, a composition for preparing the same, a polarizing plate including the same, and a liquid crystal display including the polarizing plate.

In order to solve the above problems, the present disclosure provides a wide color gamut film including:

a substrate; and a photocurable resin layer provided on at least one face of the substrate, wherein a maximum absorption wavelength is 585 to 600 nm, and an average light transmittance at a wavelength of 650 to 710 nm is more than 90%.

In addition, the present disclosure provides a polarizing plate including:

a polarizer; and a protective film on at least one face of the polarizer, wherein the protective film includes the wide color gamut film.

In addition, the present disclosure provides a liquid crystal display including:

a backlight unit;

a prism sheet provided on the backlight unit; and the polarizing plate, wherein the polarizing plate is provided on the prism sheet, and the wide color gamut film of the polarizing plate is laminated to face the prism sheet.

In addition, the present disclosure provides a composition for a wide color gamut film including:

a photocurable binder; a dye or a pigment having a maximum absorption wavelength of 580 to 610 nm; a photopolymerization initiator; and a solvent.

According to the wide color gamut film, the composition for preparing the same, the polarizing plate including the same, and the liquid crystal display including the polarizing plate of the present disclosure, a polarizing plate and an LCD having improved color gamut by alleviating the color mixing phenomenon caused by the spectral characteristics of the backlight in an LCD and increasing the color purity may be provided.

In addition, the present disclosure may solve the problem of increase in haze because of damages to the protective film of the lower polarizing plate due to the concavo-convex structure of the prism sheet provided at the lower part of the polarizing plate, and may exhibit excellent optical properties.

Furthermore, this effect may be obtained by applying the present disclosure to the lower polarizing plate of the LCD without changing the color filter or the lamination structure of the LCD, so that it is possible to reduce the process cost without requiring excessive process change or cost increase.

BRIEF DESCRIPTION OF THE DRAWINGS

FIG. 1 is a drawing illustrating the liquid crystal display according to an embodiment of the present disclosure.

DETAILED DESCRIPTION OF THE EMBODIMENTS

The wide color gamut film of the present disclosure includes a substrate; and a photocurable resin layer provided on at least one face of the substrate, wherein a maximum absorption wavelength is 585 to 600 nm, and an average light transmittance at a wavelength of 650 to 710 nm is more than 90%.

In addition, the polarizing plate of the present disclosure includes a polarizer; and a protective film on at least one face of the polarizer, wherein the protective film includes the wide color gamut film.

In addition, a liquid crystal display of the present disclosure includes a backlight unit; a prism sheet provided on the backlight unit; and the polarizing plate, wherein the polarizing plate is provided on the prism sheet, and the wide color gamut film of the polarizing plate is laminated to face the prism sheet.

In addition, the composition for a wide color gamut film of the present disclosure includes a photocurable binder; a dye or a pigment having a maximum absorption wavelength of 580 to 610 nm; a photopolymerization initiator; and a solvent.

As used herein, the term 'upper side' means a side disposed so as to face a viewer when a polarizing plate is installed in a device. In addition, an 'upper part' means a direction facing a viewer when a polarizing plate is installed in a device. On the contrary, a 'lower side' or a 'lower part' means a side or direction disposed so as to face the opposite side of a viewer, when a polarizing plate is installed in a device.

In the present disclosure, the terms "the first", "the second", and the like are used to describe a variety of components, and these terms are merely employed to differentiate a certain component from other components.

In addition, technical terms used in the present specification are only for explaining exemplary embodiments, and they are not intended to restrict the present invention. The singular expressions may include the plural expressions unless they are differently expressed contextually. It should be understood that the terms "include", "equip", "have", or the like are used to designate the existence of characteristics taken effect, numbers, steps, components, or combinations thereof, and do not exclude the existence or the possibility of addition of one or more different characteristics, numbers, steps, components of combinations thereof beforehand.

The present invention can be variously modified and have various forms, and specific examples of the present invention are explained in this description. However, it is not intended to limit the present invention to the specific examples and it must be understood that the present invention includes every modifications, equivalents, or replacements included in the idea and technical scope of the present invention.

Hereinafter, the wide color gamut film, the composition for preparing the same, the polarizing plate including the same, and the liquid crystal display including the polarizing plate of the present disclosure are explained in more detail.

According to an embodiment of the present disclosure, a wide color gamut film including a substrate; and a photocurable resin layer provided on at least one face of the substrate, wherein a maximum absorption wavelength is 585 to 600 nm, and an average light transmittance at a wavelength of 650 to 710 nm is more than 90% is provided.

The wide color gamut film of the present disclosure may be used for protecting the polarizer from outside, but is not limited thereto. It is provided on at least one face of the polarizer, and preferably used as a protective film of the lower polarizer.

Commonly, a substrate made of polyester such as polyethyleneterephtalate (PET), polyethylene such as ethylene vinyl acetate (EVA), cyclic olefin polymer (COP), cyclic olefin copolymer (COC), polyacrylate (PAC), polycarbonate (PC), polyethylene (PE), polymethylmethacrylate (PMMA), polyetheretherketon (PEEK), polyethylenenaphthalate (PEN), polyetherimide (PEI), polyimide (PI), methyl methacrylate (MMA), a fluorine resin, or triacetylcellulose (TAC) may be used to the polarizer protective films.

Among the substrates, particularly, triacetylcellulose (TAC) film is widely used due to its excellent optical properties.

On the other hand, in the emission spectrum of the backlight light source of the LCD, there is an emission spectrum between each of the RGB wavelengths as sub-bands in addition to the wavelength range corresponding to RGB, and it causes color mixing with the color filter to deteriorate the color gamut.

Further, as the display becomes larger, a slack of the lower polarizing plate occurs, and the lower polarizer protective film is damaged by the prism sheet or the diffusion film provided below the lower polarizing plate, thereby increasing the haze.

The present disclosure has been made in order to solve this problem, and it is an object to improve the color gamut at low cost by improving the polarizing plate, especially the lower polarizing plate, among elements included in the LCD without changing the backlight, the color filter, or the structure of the LCD, and prevent the problem of increase in haze due to the prism sheet or the diffusion film.

Generally, in the case of a photocurable resin layer containing a dye or a pigment, optical characteristics of the dye or the pigment are modified in the curing process due to ultraviolet light, resulting in a problem that optical properties of a photocurable resin layer and a film containing the same are deteriorated. In addition, in the case of a thermosetting resin layer containing a dye or a pigment, there is no change in optical characteristics due to ultraviolet light, but there is a problem that sufficient surface hardness and scratch resistance as a polarizer protective film cannot be satisfied.

However, the film according to the present disclosure is able to realize excellent color gamut with little or no change in light transmittance before and after UV curing, and exhibits excellent physical properties such as scratch resistance and hardness due to the photocurable resin layer, thereby effectively protecting the lower polarizing plate. Thus, it can be applied to a polarizing plate for display which becomes flatter and larger.

The wide color gamut film of the present disclosure has a different light transmittance according to the wavelength band. First, the maximum absorption wavelength (wavelength with the maximum light absorption rate) may be about 585 to about 600 nm, or about 585 to about 595 nm. The average light transmittance at a wavelength of 650 to 710 nm (T3) may be more than about 90%, more specifically, more than about 90%, or more than about 91%, and less than about 100%, or less than about 98%.

In addition, an average light transmittance at a wavelength of 400 to 550 nm (T1) is more than about 70%, more specifically, more than about 70%, or more than about 80%, and less than about 100%, or less than about 95%.

In addition, an average light transmittance (T2) at a wavelength of 580 to 610 nm is more than about 20% and less than about 50%, or more than about 25% and less than about 50%.

Due to the difference in light transmittance according to the wavelength band and the maximum absorption wavelength characteristic as described above, the film absorbs lights of an unnecessary wavelength band among lights incident from a backlight in an LCD, thereby reducing intensity. Accordingly, the film may provide a polarizing plate and an LCD having improved color gamut by alleviating a color mixing phenomenon caused by mismatch between spectral characteristics of a backlight and a color filter, and increasing color purity. Further, since it satisfies sufficient surface hardness and scratch resistance as a polarizer protective film, it can be applied as a polarizer protective film.

The wide color gamut film of the present disclosure has a maximum absorption wavelength of about 580 to about 610 nm, or about 590 to about 600 nm, or about 590 to about 595 nm. As the film contains a dye or a pigment stable to radicals or cations generated during curing of photocurable binder, it can exhibit the different light transmittance according to the wavelength band as described above.

In the wide color gamut film of the present disclosure, the substrate on which the photocurable resin layer is formed may be a transparent plastic resin which is usually used as a polarizer protective film. More specifically, polyester such as polyethyleneterephtalate (PET), polyethylene such as ethylene vinyl acetate (EVA), cyclic olefin polymer (COP), cyclic olefin copolymer (COC), polyacrylate (PAC), polycarbonate (PC), polyethylene (PE), polymethylmethacrylate (PMMA), polyetheretherketon (PEEK), polyethylenenaphthalate (PEN), polyetherimide (PEI), polyimide (PI), methyl methacrylate (MMA), a fluorine resin, or triacetylcellulose (TAC) may be used as the substrate.

Preferably, the substrate may be a film including triacetylcellulose (TAC).

The thickness of the substrate is not particularly limited, but a substrate having a thickness of about 20 to about 100 μm, or about 20 to about 60 μm, which can satisfy the hardness and other physical properties of the polarizing plate, may be used.

The dye or the pigment included in the wide color gamut film of the present disclosure has a maximum absorption wavelength of about 580 to about 610 nm, or about 590 to about 600 nm, or about 590 to about 595 nm, which is an orange region, and a change in light transmittance in the region of 650 to 710 nm before and after irradiation with ultraviolet light of less than 5%, exhibiting stable characteristics against radicals or cations generated during curing of the photocurable binder.

The examples of the dye or the pigment exhibiting these characteristics include compounds having a bulky substituent structure such as an aromatic ring or a heteroaromatic ring among a porphyrin derivative compound, a cyanine derivative compound, or a squarylium derivative compound, but are not limited thereto.

The dye or the pigment satisfying the above-mentioned conditions absorb unnecessary lights of the spectrum band in which causes a color mixing problem with a color filter among lights incident from a backlight such as CCFL, LED, etc. of the LCD. Therefore, a film and a polarizing plate including the photocurable resin layer manufactured using the composition including the same may have a color gamut of about 10% or more higher than that of the conventional polarizing plate.

According to an embodiment of the present disclosure, the wide color gamut film may have a change in light transmittance in the region of 650 to 710 nm before and after ultraviolet (UV) curing of less than 5%. That is, the wide color gamut film of the present disclosure may have a change in light transmittance measured by the following Formula 1 of less than 5%, preferably less than 2%, more preferably less than 1%.

$$A \text{ change in light transmittance} = \frac{\begin{pmatrix} \text{an average light transmittance at a} \\ \text{wavelength of 650 to 710 nm before } UV \text{ curing} - \\ \text{an average light transmittance at a} \\ \text{wavelength of 650 to 710 nm after } UV \text{ curing} \end{pmatrix}}{\text{an average light transmittance at a wavelength of 650 to 710 nm before } UV \text{ curing}} \times 100 \quad \text{[Formula 1]}$$

in Formula 1, UV curing means that a composition for forming a photocurable resin layer is coated on a transparent substrate, and is cured using ultraviolet light having a wavelength of 290 to 320 nm at an irradiation dose of 20 to 600 mJ/cm$^2$.

According to an embodiment of the present disclosure, the wide color gamut film includes about 0.1 to about 5 parts by weight, preferably about 0.1 to about 3 parts by weight of the dye or the pigment having a maximum absorption wavelength of 580 to 610 nm based on 100 parts by weight of the photocurable resin layer. When the dye or the pigment is included too little, the effect of improving the color gamut may be insufficient because of insufficient light absorption effect. When the dye or the pigment is included too much, the luminance may be lowered and other physical properties of the film may be lowered. Therefore, it is preferable that the dye or the pigment is included within the above weight ratio.

According to an embodiment of the present disclosure, the photocurable resin layer may include a cured product of at least one photocurable binder selected from the group consisting of a polyfunctional acrylate-based monomer, a polyfunctional acrylate-based oligomer, and a polyfunctional urethane acrylate-based elastic polymer.

According to an embodiment of the present disclosure, the photocurable resin layer may further include an organic fine particle or an inorganic fine particle to improve hardness.

The photocurable binder and other components contained in the photocurable resin layer will be described in detail in a composition for a wide color gamut film.

The wide color gamut film of the present disclosure may have a pencil hardness under a load of 500 g of H or higher, or 2H or higher.

In addition, the wide color gamut film may exhibit scratch resistance, that is, it may not have any scratches after moving the same 10 times back and forth in a friction tester with a steel wool #0 under a load of 200 g, or 300 g, or 400 g.

As described above, the wide color gamut film of the present disclosure may have improved color gamut by alleviating a color mixing phenomenon caused by mismatch between spectral characteristics of a backlight and a color filter and increasing color purity, due to the specific light transmittance characteristic according to the wavelength band. In addition to this, it exhibits excellent physical properties such as scratch resistance and hardness, and protects the polarizing plate effectively, thereby preventing the problem of increase in haze due to contact or friction with the lower structure of the polarizing plate. Thus, it can exhibit excellent optical properties.

The wide color gamut film having the above-described optical and physical properties may be obtained by coating a composition for a wide color gamut film including a photocurable binder; a dye or a pigment having a maximum absorption wavelength of 580 to 610 nm; a photopolymerization initiator; and a solvent on a substrate, and curing.

The photocurable binder is not particularly limited, as long as it is a compound including an unsaturated functional group capable of causing a polymerization reaction by ultraviolet light, and may include a (meth)acrylate group, an allyl group, an acryloyl group, or a vinyl group as a photocurable functional group. According to an embodiment of the present disclosure, the photocurable binder may be at least one selected from the group consisting of a polyfunctional acrylate-based monomer, a polyfunctional acrylate-based oligomer, and a polyfunctional acrylate-based elastic polymer.

In the present disclosure, the term "acrylate-based" is intended to encompass acrylate, methacrylate, and derivatives thereof with various substituents.

The polyfunctional acrylate-based monomer means a monomer having 2 or more acrylate-based functional groups, and having a weight average molecular weight of less than 1,000 g/mol. For Example, it may be hexanediol diacrylate (HDDA), tripropyleneglycol diacrylate (TPGDA), ethyleneglycol diacrylate (EGDA), trimethylolpropane triacrylate (TMPTA), trimethylolpropaneethoxy triacrylate (TMPEOTA), glycerin propoxylated triacrylate (GPTA), pentaerythritol tetraacrylate (PETA), or dipentaerythritol hexaacrylate (DPHA), and so on, but is not limited thereto. The polyfunctional acrylate-based monomer is crosslinked with each other or with the acrylate-based oligomer and the polyfunctional acrylate-based elastic polymer disclosed below, and plays a role of giving a certain hardness and wear resistance to the film.

The polyfunctional acrylate-based monomer may be used solely or in combination with different monomers.

The polyfunctional acrylate-based oligomer is an oligomer having 2 or more acrylate functional groups, and may have a weight average molecular weight of about 1,000 to about 10,000 g/mol, or about 1,000 to about 5,000 g/mol, or about 1,000 to about 3,000 g/mol.

According to an embodiment of the present disclosure, the polyfunctional acrylate-based oligomer may have an elongation of about 5 to about 200%, or about 5 to about 100%, or about 10 to about 50% when it is measured according to ASTM D638. When the acrylate-based oligomer has the elongation within the above range, it can show excellent flexibility and elasticity without a decrease in mechanical properties. The polyfunctional acrylate-based oligomer satisfying the above mentioned elongation range may be superior in flexibility and elasticity and form a cured resin with the polyfunctional acrylate-based monomer and the polyfunctional acrylate-based elastic polymer, and can provide sufficient flexibility and curling property to the film including the same.

According to an embodiment of the present disclosure, the polyfunctional acrylate-based oligomer may be an acrylate-based oligomer modified with one or more of urethane, ethylene oxide, propylene oxide, or caprolactone. When the modified polyfunctional acrylate-based oligomer is used, more flexibility can be given to the polyfunctional acrylate-based oligomer by the modification, and the curling property and the flexibility of the film can be improved.

The acrylate-based oligomer may be used solely or in combination with different oligomers.

The polyfunctional acrylate-based elastic polymer is excellent in flexibility and elasticity, and is a polymer having 2 or more acrylate functional groups. It may have a weight average molecular weight of about 100,000 to about 800,000 g/mol, or about 150,000 to about 700,000 g/mol, or about 180,000 to about 650,000 g/mol.

The film formed using the composition containing the polyfunctional acrylate-based elastic polymer may exhibit high elasticity or flexibility while having excellent mechanical properties, and can minimize the occurrence of curl or cracks.

According to a embodiment of the present disclosure, the polyfunctional acrylate-based elastic polymer may have an elongation of about 5 to about 200%, or about 5 to about 100%, or about 10 to about 50% when it is measured according to ASTM D638. When the polyfunctional acrylate-based elastic polymer has the elongation within the above range, it can show excellent flexibility and elasticity without a decrease in mechanical properties.

An example of the polyfunctional acrylate-based elastic polymer may be polyrotaxane.

The polyrotaxane is a polymer composed of dumbbell-shaped molecules and cyclic compounds (macrocycle) which are structurally interlocked. The dumbbell-shaped molecule includes a certain linear molecule and stopper groups placed at both ends of the linear molecule and the linear molecule passes through the inside of the macrocycle, and the macrocycle can move along the linear molecule and is prevented by the stopper groups from dissociation.

According to an embodiment of the present disclosure, the polyrotaxane may include a rotaxane compound including a macrocycle connected with a lactone compound with a acrylate moiety introduced to the end thereof; a linear compound passing through the macrocycle; and the stopper groups placed at both ends of the linear compound so as to prevent the macrocycle from dissociation.

No particular limitations are imposed on the macrocycle if it is large enough to pass or surround the linear molecule. The macrocycle may include a functional group such as a hydroxide group, an amino group, a carboxyl group, a thiol group, an aldehyde group or the like, which can react with other polymers or compounds. Specific examples of the macrocycle may be α-cyclodextrin, β-cyclodextrin, γ-cyclodextrin and mixtures thereof.

Furthermore, any compound of linear form having a regular molecular weight or more may be used as the linear molecule without restriction, and polyalkylene compounds or polylactone compounds may be used. Specifically, polyoxyalkylene compounds including $C_{1-8}$ oxyalkylene repeating units or polylactone compounds including $C_{3-10}$ lactone repeating units may be used.

In addition, the linear molecule may have a weight average molecular weight of about 1,000 to about 50,000 g/mol. When the weight average molecular weight of the linear molecule is too small, mechanical properties or self-healing ability of the film formed using the same may be insufficient. When the weight average molecular weight is too large, compatibility of the film may be decreased, or appearance characteristics or uniformity of the material may be greatly deteriorated.

Meanwhile, the stopper group may be appropriately adjusted depending on the characteristics of the polyrotaxane to be prepared. For example, the stopper group may be at least one selected from the group consisting of a dinitrophenyl group, a cyclodextrin group, an adamantane group, a trityl group, a fluorescein group, and a pyrene group.

Another example of the polyfunctional acrylate-based elastic polymer may be urethane-based acrylate polymer. The urethane-based acrylate polymer has a form in which urethane-based acrylate oligomer is side-linked to the main chain of the acrylic polymer.

According to an embodiment of the present disclosure, the composition containing the dye or the pigment may have a change in light transmittance in the region of 650 to 710 nm before and after ultraviolet (UV) curing of less than 5%. That is, the composition of the present disclosure may have a change in light transmittance measured by the following Formula 1 of less than 5%, preferably less than 2%, more preferably less than 1%.

[Formula 1]

$$A\ change\ in\ light\ transmittance = \frac{\begin{array}{c}(an\ average\ light\ transmittance\ at\ a\\ wavelength\ of\ 650\ to\ 710\ nm\ before\ UV\ curing -\\ an\ average\ light\ transmittance\ at\ a\\ wavelength\ of\ 650\ to\ 710\ nm\ after\ UV\ curing)\end{array}}{\begin{array}{c}an\ average\ light\ transmittance\ at\ a\\ wavelength\ of\ 650\ to\ 710\ nm\ before\ UV\ curing\end{array}} \times 100$$

in Formula 1, UV curing means that the composition is coated on a transparent substrate, and is cured using ultraviolet light having a wavelength of 290 to 320 nm at an irradiation dose of 20 to 600 mJ/cm$^2$.

In the case of general dyes or pigments, the molecular structure is modified by ultraviolet irradiation in the curing process and the optical properties are changed. In particular, new absorption peaks at wavelengths of 650 to 710 nm often occur after ultraviolet curing. Therefore, there is a limitation in applying an ultraviolet curable coating layer containing the dye or the pigment to the polarizing plate in which light transmittance characteristics are important. However, as described above, the composition of the present disclosure may have a change in light transmittance of less than 5% in the region of 650 to 710 nm before and after UV curing, and a further absorption peak in the wavelength region of 650 to 710 nm may be rarely detected, thereby improving luminance and color gamut.

More specific examples of the dye or the pigment satisfying these conditions include compounds having a maximum absorption wavelength of about 580 to about 610 nm, or about 590 to about 600 nm, or about 590 to about 595 nm, and being stable to radicals or cations generated during curing of the photocurable binder. These examples may be a porphyrin derivative compound, a cyanine derivative compound, or a squarylium derivative compound having a bulky substituent structure such as an aromatic ring or a heteroaromatic ring, but are not limited thereto.

According to an embodiment of the present disclosure, the dye or the pigment having a maximum absorption wavelength of 580 to 610 nm may be included in an amount of about 0.1 to about 5 parts by weight, preferably about 0.1 to about 3 parts by weight, based on 100 parts by weight of the photocurable binder. When the dye or the pigment is included too little, the effect of improving the color gamut may be insufficient because of insufficient light absorption effect. When the dye or the pigment is included too much, the luminance may be lowered and other physical properties of the composition may be lowered. Therefore, it is preferable that the dye or the pigment is included within the above weight ratio.

The photopolymerization initiator included in the composition of the present disclosure may be 1-hydroxy-cyclohexyl-phenyl ketone, 2-hydroxy-2-methyl-1-phenyl-1-propanone, 2-hydroxy-1-[4-(2-hydroxyethoxy) phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl (2,4,6-trimethylbenzoyl)-phosphineoxide, bis(2,4,6-trimethylbenzoyl)-phenylphosphineoxide, and so on, but it is not limited to or by them. Furthermore, as the products sold today, Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F and so on may be used. The photopolymerization initiator may be used solely or by mix of different 2 or more initiators.

According to an embodiment of the present disclosure, the content of the photopolymerization initiator is not particularly limited, but the photopolymerization initiator may be included in an amount of about 0.1 to about 10 parts by weight, preferably about 0.1 to about 5 parts by weight, based on 100 parts by weight of the photocurable binder in order to carry out the photopolymerization effectively without inhibiting the properties of the entire composition.

As the organic solvent included in the composition of the present disclosure, an alcohol solvent such as methanol, ethanol, isopropyl alcohol, and butanol; an alkoxy alcohol solvent such as 2-methoxyethanol, 2-ethoxyethanol, and 1-methoxy-2-propanol; a ketone solvent such as acetone, methyl ethyl ketone, methyl isobutyl ketone, methyl propyl ketone, and cyclohexanone; an ether solvent such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethyl glycol monopropyl ether, diethyl glycol monobutyl ether, and diethylene glycol-2-ethylhexyl ether; and an aromatic solvent such as benzene, toluene, and xylene may be used solely or in combination thereof.

According to an embodiment of the present disclosure, the content of the organic solvent is not particularly limited, because it can be variously modified within the range in that the properties of the composition are not deteriorated. The organic solvent may be included in an amount of about 10 to about 400 parts by weight, preferably about 100 to about 200 parts by weight, based on 100 parts by weight of the photocurable binder in order to have appropriate fluidity and applicability.

According to an embodiment of the present disclosure, the composition may exhibit antiglare property by further including an organic fine particle or an inorganic fine particle. When the composition includes the organic fine particle or the inorganic fine particle, the cured resing layer using the same may have a characteristic of light scattering and exhibit antiglare property.

The particle diameter of the organic or inorganic fine particle may be about 1 µm or more in terms of optimizing the scattering effect of light, and 10 µm or less in terms of proper haze and coating thickness. More specifically, the particle diameter of the organic or inorganic fine particle may be about 1 to about 10 µm, preferably about 1 to about 5 µm, more preferably about 1 to about 3 µm. When the particle diameter of the organic or inorganic fine particle is less than 1 µm, the effect of preventing glare due to light scattering may be insignificant. If the particle diameter exceeds 10 µm, it is necessary to increase the coating thickness in order to have appropriate level of haze, but cracks may occur in this case.

In addition, the volume average particle diameter of the organic or inorganic fine particle may be about 2 to about 10 µm, preferably about 2 to about 5 µm, and more preferably about 2 to about 3 µm.

For example, the organic fine particle may be at least one selected from organic fine particles consisting of an acrylic-based resin, a styrene-based resin, an epoxy resin and a nylon resin.

More specifically, the organic fine particle may be at least one selected from the group consisting of methyl(meth)acrylate, ethyl(meth)acrylate, propyl(meth)acrylate, n-butyl (meth)acrylate, isobutyl(meth)acrylate, t-butyl(meth)acrylate, 2-ethylhexyl(meth)acrylate, n-octyl(meth)acrylate, lauryl(meth)acrylate, stearyl(meth)acrylate, 2-hydroxyethyl (meth)acrylate, polyethylene glycol(meth)acrylate, methoxypolyethylene glycol(meth)acrylate, glycidyl(meth) acrylate, dimethylaminoethyl(meth)acrylate, diethylaminoethyl(meth)acrylate, styrene, p-methylstyrene, m-methylstyrene, p-ethylstyrene, m-ethylstyrene, p-chlorostyrene, m-chlorostyrene, p-chloromethylstyrene, m-chloromethylstyrene, styrenesulfonic acid, p-t-butoxystyrene, m-t-butoxystyrene, vinyl acetate, vinyl propionate, vinyl butyrate, vinyl ether, allyl butyl ether, allyl glycidyl ether, (meth) acrylic acid, maleic acid, unsaturated carboxylic acid, alkyl (meth)acrylamide, (meth) acrylonitrile, and (meth)acrylate, but is not limited thereto.

In addition, the organic fine particle may be at least one selected from the group consisting of polystyrene, polymethyl methacrylate, polymethyl acrylate, polyacrylate, polyacrylate-co-styrene, polymethyl acrylate-co-styrene, polymethyl methacrylate-co-styrene, polycarbonate, polyvinyl chloride, polybutylene terephthalate, polyethylene terephthalate, polyamide resin, polyimide resin, polysulfone, polyphenylene oxide, polyacetal, epoxy resin, phenol resin, silicone resin, melamine resin, benzoguanamine, polydivinylbenzene, polydivinylbenzene-co-styrene, polydivinylbenzene-co-acrylate, polydiallyl phthalate, and triallyl isocyanurate polymer, or copolymers of two or more thereof, but is not limited thereto.

In addition, the inorganic fine particle may be at least one selected from the group consisting of silicon oxide, titanium dioxide, indium oxide, tin oxide, zirconium oxide, and zinc oxide, but is not limited thereto.

The total content of the organic and inorganic fine particle may be about 1 to about 20 parts by weight, preferably about 5 to about 15 parts by weight, more preferably about 6 to about 10 parts by weight based on 100 parts by weight of the photocurable binder. When the total content of the organic and inorganic fine particle is less than 1 part by weight based on 100 parts by weight of the photocurable binder, the haze value may be insufficient due to internal scattering. When the total content of the organic and inorganic fine particle exceeds 20 parts by weight, the coating property may become poor due to high viscosity of the composition, and the haze value may become too high due to the internal scattering, thereby reducing the contrast ratio.

According to an embodiment of the present disclosure, the organic or inorganic fine particle may have a difference in refractive index of about 0.005 to about 0.1, preferably about 0.01 to about 0.07, more preferably about 0.015 to about 0.05, with respect to the photocurable resin layer. When the difference in refractive index is less than 0.005, it may be difficult to obtain an appropriate haze value required for preventing glare. When the difference in refractive index is more than 0.1, the internal scattering may increase and the haze value may also increase, but the contrast ratio may be reduced.

Furthermore, the composition of the present disclosure may further include additives such as a surfactant, an antioxidant, a UV stabilizer, a leveling agent, and an antifouling agent which are commonly used in the art. The content is not particularly limited, because it can be variously modified within the range in that the properties of the composition are not deteriorated. For example, the additives may be included in an amount of about 0.1 to about 10 parts by weight, based on 100 parts by weight of the entire composition.

According to an embodiment of the present disclosure, the photocurable resin layer formed using the composition may have a thickness of about 1 µm or more, for example, about 1 to about 20 µm, or about 2 to about 10 µm, or about 2 to about 5 µm after drying and curing, and may exhibit appropriate optical and physical properties within the thickness range.

The method of coating the composition is not particularly limited, if it can be used in the related art. For example, bar-coating method, knife-coating method, roll-coating method, blade-coating method, die-coating method, microgravure-coating method, comma-coating method, slot die-coating method, lip-coating method, or solution casting method may be used.

Subsequently, the photocuring reaction may be carried out by exposing the coated resin composition to ultraviolet light so as to form the wide color gamut film. Before the ultraviolet light irradiation, the processes for leveling the coated surface of the composition and drying the same for evaporating the solvent included in the composition may be further carried out.

The irradiation dose of ultraviolet light, for example, may be about 20 to about 600 mJ/cm$^2$. The source of the UV irradiation is not particularly limited, if it can be used in the related art. For example, a high pressure mercury lamp, a metal halide lamp, a black light fluorescent lamp, and so on may be used.

According to another embodiment of the present disclosure, a polarizing plate including a polarizer; and a protective film on at least one face of the polarizer, wherein the protective film includes the above-mentioned wide color gamut film, is provided.

Details and specific examples of the wide color gamut film and components contained therein are the same as disclosed above.

A polarizer exhibits a property making it able to extract only lights that vibrate in one direction from lights incident while vibrating in different directions. This property may be achieved by stretching polyvinyl alcohol (PVA) having iodine absorbed thereto under strong tension. For example, more specifically, a polarizer may be formed by swelling a PVA film in an aqueous solution, dyeing the swollen PVA film with a dichroic material to impart polarization performance to the film, stretching the dyed PVA film to arrange the dichroic material parallel to a stretch direction, and correcting the color of the stretched PVA film. However, the polarizing plate of the present disclosure is not limited thereto.

According to an embodiment of the present disclosure, the wide color gamut film may be laminated on both faces of the polarizer.

According to another embodiment of the present disclosure, the wide color gamut film may be laminated on just one face of the polarizer, and any other general film such as TAC which is generally used to protect the polarizer may be laminated on the other face of the same.

Herein, the polarizing plate of the present disclosure may be used as a lower polarizing plate of the LCD, and the wide color gamut film may be positioned at the lower part in the laminated structure of the LCD.

As described above, the polarizing plate of the present disclosure may provide an LCD improved in color gamut by alleviating the color mixing phenomenon caused by the spectral characteristics of the backlight in the LCD and increasing the color purity due to the light transmittance characteristic according to the wavelength of the wide color gamut film.

In addition, when the polarizing plate of the present disclosure is laminated on the LCD with the wide color gamut film facing downward as described above, there is an additional advantage of being able to exhibit excellent optical properties by preventing the problem of increased haze because of damages to the protective film of the lower polarizing plate due to the concavo-convex structure of the prism sheet or the diffusion film provided at the lower part of the polarizing plate.

The polarizer and the wide color gamut film may be adhered by lamination using an adhesive, and the like. Adhesives are not particularly limited, as long as they are known in the art. For example, an aqueous adhesive, a one-component or two-component polyvinyl alcohol (PVA) adhesive, a polyurethane adhesive, an epoxy adhesive, a styrene butadiene rubber adhesive (SBR adhesive), or a hot melt type adhesive may be used, but is not limited thereto.

When the wide color gamut film of the present disclosure is laminated and adhered to the polarizer, it is preferable that the substrate surface on which the photocurable resin layer is not formed is adhered to the polarizer, and the photocurable resin layer is laminated so as to be positioned outside the polarizing plate.

The polarizing plate including the wide color gamut film of the present disclosure is explained to be applicable to the LCD as an example, but is not limited thereto, and can be applied in various fields. For example, it may be used to mobile communication handsets, smart phones, other mobile devices, display devices, electronic blackboards, outdoor billboards, and various display parts. According to the present disclosure, the polarizing plate may be a polarizing plate for TN (Twisted Nematic) or STN (Super Twisted Nematic) liquid crystals, a polarizing plate for horizontal alignment modes such as IPS (In-Plane Switching), Super-IPS, FFS (Fringe Field Switching), etc., or a polarizing plate for vertical alignment modes.

According to another embodiment of the present disclosure, a liquid crystal display including a backlight unit; a prism sheet provided on the backlight unit; and the polarizing plate, wherein the polarizing plate is provided on the prism sheet, and the wide color gamut film of the polarizing plate is laminated to face the prism sheet is provided.

FIG. 1 is a drawing illustrating the liquid crystal display according to an embodiment of the present invention.

Referring to FIG. 1, a liquid crystal display (1) of the present disclosure includes a backlight unit (10), a prism sheet (20) provided on the backlight unit (10), and the polarizing plate (100), wherein the polarizing plate is provided on the prism sheet (20), and the wide color gamut film (40) of the polarizing plate is laminated to face the prism sheet (20).

The backlight unit (10) includes a light source that emits lights from the back surface of the liquid crystal panel. The type of the light source is not particularly limited, and a general light source for LCD such as CCFL, HCFL, or LED may be used.

The prism sheet (20) is provided on the backlight unit (10). The prism sheet (20) is provided to increase the brightness of light again, because the brightness is decreased when the lights emitted from the backlight unit (10) pass through a light guide plate and a diffusion sheet (not shown in the FIGURE). This prism sheet (20) is provided below the lower polarizer plate. However, since the prism sheet (20) includes a concavo-convex structure, a protective film of the lower polarizer plate, which is in contact with the prism sheet (20), is damaged, thereby increasing the haze.

However, the liquid crystal display of the present disclosure may solve the problem by laminating the polarizing plate (100), in the manner of laminating the photocurable resin layer (30a) of the wide color gamut film (40) to face the prism sheet (20).

That is, referring to FIG. 1, the polarizing plate (100) is provided on the prism sheet (20), wherein the polarizing plate includes the polarizer (50), the general protective film (60) provided on one face of the polarizer, and the wide color gamut film (40) including the photocurable resin layer (30a) provided on the other face of the polarizer. Herein, the wide color gamut film (40) of the present disclosure is laminated at the lower part of the LCD, that is, laminated to face the prism sheet (20). Due to this laminated structure, the problem of increase in haze because of the damages to the polarizing plate (100) due to concavo-convex structure of the prism sheet (20) may be prevented, thereby exhibiting excellent optical properties.

Also, as described above, the LCD having improved color gamut may be provided by alleviating a color mixing phenomenon caused by spectral characteristics of a backlight and increasing color purity, due to the light transmittance characteristic according to the wavelength of the photocurable resin layer (30a) of the wide color gamut film (40).

In addition, according to an embodiment of the present disclosure, a diffusion film or DBEF (Dual Brightness Enhancement Film) (not shown in the FIGURE) may be further included between the prism sheet (20) and the polarizing plate (100), or between the backlight unit (10) and the prism sheet (20). When the diffusion film or the DBEF film is positioned between the prism sheet (20) and the polarizing plate (100), the wide color gamut film (40) of the polarizing plate (100) is in contact with the diffusion film or the DBEF film. Even in this case, the problems of damages to the lower polarizing plate and increase in haze due to the diffusion film or the DBEF film may be similarly prevented.

Layers provided on the upper part of the polarizing plate (100) are in accordance with the structure of a general liquid crystal display. FIG. 1 illustrates that a lower glass substrate (70), a thin film transistor (75), a liquid crystal layer (80), a color filter (85), an upper glass substrate (90), and an upper polarizing plate (95) are laminated in order. However, the LCD of the present disclosure is not limited thereto, and may include all of the structures that some of the layers shown in FIG. 1 are modified or removed, and other layers, substrates, films, sheets, or the like are added.

A better understanding of the present invention may be obtained through the following examples which are set forth to illustrate, but are not to be construed as limiting the present invention.

EXAMPLES

Preparation of the Wide Color Gamut Film

Example 1

A composition was prepared by mixing 50 g of pentaerythritol tri(tetra) acrylate (PETA), 50 g of 6-functional urethane acrylate (product name: UA-3061), 1 g of dye A (porphyrin-based dye having a maximum absorption wavelength of 593 nm), 1 g of a photopolymerization initiator (product name: Irgacure 184), and 100 g of solvent MEK, and coated on a TAC film having a thickness of 60 μm. After drying the same at 60° C. for 2 mins, the photocurable resin layer having a thickness of 5 μm was prepared by irradiating UV light at a dose of 200 mj/cm$^2$ using a mercury lamp.

Example 2

The film was prepared according to the same method as in Example 1, except that the dye A was used in an amount of 1.5 g.

Comparative Example 1

The film was prepared according to the same method as in Example 1, except that the dye A was not used.

Comparative Example 2

The film was prepared according to the same method as in Example 1, except that 1 g of dye B (porphyrin-based dye having a maximum absorption wavelength of 532 nm) was used instead of the dye A.

Comparative Example 3

The film was prepared according to the same method as in Example 1, except that 1.5 g of dye C (porphyrin-based dye having a maximum absorption wavelength of 594 nm) was used instead of the dye A.

Comparative Example 4

A composition was prepared by mixing 100 g of poly (methyl methacrylate) PMMA, 1 g of dye A, and 100 g of solvent MEK, and coated on a TAC film having a thickness of 60 μm. After heating the same at 90° C. for 5 mins, a thermoplastic resin layer having a thickness of 5 μm was prepared.

In addition, UV light was irradiated thereto at a dose of 200 mj/cm$^2$ using a mercury lamp to measure the light transmittance after ultraviolet curing.

Preparation of the Polarizing Plate

Example 3

After laminating and adhering the film prepared in Example 1 on a PVA film by using an aqueous adhesive so that the thickness of the adhesive layer was about 100 nm, TAC having a thickness of 60 μm was laminated on the other face of the PVA according to the same method above to prepare the polarizing plate.

Example 4

The polarizing plate was prepared according to the same method as in Example 3, except that the film of Example 2 was laminated on one face of the PVA film instead of the film of Example 1.

Comparative Example 5

The polarizing plate was prepared according to the same method as in Example 3, except that the film of Comparative Example 1 was laminated on one face of the PVA film instead of the film of Example 1.

Comparative Example 6

The polarizing plate was prepared according to the same method as in Example 3, except that the film of Comparative Example 2 was laminated on one face of the PVA film instead of the film of Example 1.

Comparative Example 7

The polarizing plate was prepared according to the same method as in Example 3, except that the film of Comparative Example 3 was laminated on one face of the PVA film instead of the film of Example 1.

Comparative Example 8

The polarizing plate was prepared according to the same method as in Example 3, except that the film of Comparative Example 4 was laminated on one face of the PVA film instead of the film of Example 1.

Experimental Examples

<Measuring Methods>
The properties of the films of the Examples 1 and 2 and Comparative Examples 1 to 4 were measured by the following methods.
1) Light Transmittance and Maximum Absorption Wavelength Light transmittance at a wavelength of 300 to 800 nm was measured using an UV-VIS-NIR spectrometer (Solidspec-3700, manufacturer: SHIMADZU) in an integrating sphere type.

2) Scratch Resistance

Surface of the resin layer of the films of the Examples 1 to 2 and Comparative Examples 1 to 4 was rubbed 10 times back and forth with a steel wool #0 under a different load, and the maximum load at which no scratches were observed was checked.

3) Pencil Hardness

Pencil hardness was measured using a pencil hardness tester (precision tester, manufacturer: Chungbuk Tech) under a load of 500 g. Changes of the surface of the resin layer were observed, after the resin layer was scratched while keeping an angle of 45 degrees, using standard pencils (Mitsubishi) from 6B to 9H in accordance with ASTM 3363-74. An average value after 5 measurements was written for each experiment.

The results of the measurements are listed in the following Table 1.

TABLE 1

|  | Example 1 | Example 2 | Comparative Example 1 | Comparative Example 2 | Comparative Example 3 | Comparative Example 4 |
|---|---|---|---|---|---|---|
| Maximum absorption wavelength (unit: nm) | 593 | 593 | — | 532 | 594 | 593 |
| An average light transmittance at a wavelength of 400~550 nm (T1) (unit: %) | 90.1 | 84.7 | 91.2 | 71.5 | 82.1 | 84.3 |
| An average light transmittance at a wavelength of 580~610 nm (T2) (unit: %) | 47.5 | 29.6 | 93.0 | 89.8 | 31.3 | 30.5 |
| An average light transmittance at a wavelength of 650~710 nm (T3) (unit: %) | 92.5 | 92.1 | 92.3 | 92.1 | 85.3 | 92.3 |
| A change in light transmittance at a wavelength of 650~710 nm before and after ultraviolet light curing (unit: %) | 0.21 | 0.2 | 0.15 | 0.17 | 7.58 | 0.15 |
| Scratch resistance | 500 g | 400 g | 500 g | 300 g | 500 g | 50 g |
| Pencil hardness | 3H | 2H | 3H | 2H | 3H | HB |

* A change in light transmittance at a wavelength of 650 to 710 nm before and after ultraviolet light curing was calculated as a percentage of difference ($_T1 - _T2$) between an average light transmittance at a wavelength of 650 to 710 nm before UV curing ($_T1$) and an average light transmittance at a wavelength of 650 to 710 nm after UV curing ($_T2$) with respect to ($_T1$).

As shown in the Table 1, the wide color gamut film according to an embodiment of the present disclosure had an average light transmittance in the wavelength region of 400 to 550 nm of more than 70%, an average light transmittance in the wavelength region of 580 to 610 nm of more than 20% and less than 50%, an average light transmittance in the wavelength region of 650 to 710 nm of more than 90%, and a maximum absorption wavelength of 585 to 600 nm. That is, it exibited an inherent light transmittance characteristic according to the wavelength.

Accordingly, it exhibited a change in light transmittance at a wavelength of 650 to 710 nm before and after ultraviolet light curing of less than 5%, exhibiting excellent light stability against ultraviolet light and high color gamut. In addition, it exhibited scratch resistance of 400 g or more and pencil hardness of 2H or more, exhibiting suitable properties for a polarizing plate for a liquid crystal display.

On the other hand, Comparative Examples 1 to 3 did not show light transmittance and light stability according to the wavelength as in the present disclosure, and Comparative Example 4 did not exhibit sufficient scratch resistance and pencil hardness due to the thermoplastic resin layer.

What is claimed is:

1. A wide color gamut film comprising:
   a substrate; and
   a photocurable resin layer provided on at least one complete face of the substrate,
   wherein a maximum absorption wavelength is 585 to 600 nm, and an average light transmittance at a wavelength of 650 to 710 nm is more than 90%,
   wherein the wide color gamut film has a pencil hardness under a load of 500 g that is H or higher, and
   wherein the wide color gamut film comprises 1 to 5 parts by weight of a dye or a pigment having a maximum absorption wavelength of 580 to 610 nm based on 100 parts by weight of the photocurable resin layer.

2. The wide color gamut film of claim 1, wherein an average light transmittance at a wavelength of 400 to 550 nm is more than 70%, and
   an average light transmittance at a wavelength of 580 to 610 nm is more than 20% and less than 50%.

3. The wide color gamut film of claim 1, wherein the wide color gamut film does not have any scratches after moving the same 10 times back and forth in a friction tester with a steel wool #0 under a load of 200 g.

4. The wide color gamut film of claim 1, wherein the dye or the pigment having a maximum absorption wavelength of 580 to 610 nm comprises at least one selected from the group consisting of a porphyrin derivative compound, a cyanine derivative compound, and a squarylium derivative compound.

5. The wide color gamut film of claim 1, wherein a change in light transmittance of the following Formula 1 is less than 5%:

$$\text{A change in light transmittance} = \frac{\begin{pmatrix}\text{an average light transmittance at a}\\\text{wavelength of 650 to 710 nm before }UV\text{ curing}-\\\text{an average light transmittance at a}\\\text{wavelength of 650 to 710 nm after }UV\text{ curing}\end{pmatrix}}{\begin{matrix}\text{an average light transmittance at a}\\\text{wavelength of 650 to 710 nm before }UV\text{ curing}\end{matrix}} \times 100 \quad \text{[Formula 1]}$$

in Formula 1, UV curing means that a composition for forming a photocurable resin layer is coated on a transparent substrate, and is cured using ultraviolet light having a wavelength of 290 to 320 nm at an irradiation dose of 20 to 600 mJ/cm$^2$.

6. A polarizing plate, comprising:

a polarizer; and a protective film on at least one face of the polarizer, wherein the protective film comprises the wide color gamut film of claim 1.

7. A liquid crystal display comprising:

a backlight unit;

a prism sheet provided on the backlight unit; and the polarizing plate of claim 6, wherein the polarizing plate is provided on the prism sheet, and the wide color gamut film of the polarizing plate is laminated to face the prism sheet.

8. The liquid crystal display of claim 7, further comprising a diffusion film or DBEF (Dual Brightness Enhancement Film) between the prism sheet and the polarizing plate.

* * * * *